(12) United States Patent
Matsuno

(10) Patent No.: US 6,442,469 B1
(45) Date of Patent: Aug. 27, 2002

(54) APPARATUS AND METHOD FOR CONTROLLING VEHICLE BEHAVIOR

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,192

(22) Filed: Oct. 10, 2001

(30) Foreign Application Priority Data

Oct. 11, 2000 (JP) ........................................ 2000-311042

(51) Int. Cl.⁷ ................................................ B60T 8/24
(52) U.S. Cl. ............................. 701/70; 701/72; 701/75; 73/121; 303/140
(58) Field of Search ............................ 701/70, 72, 75, 701/48; 73/121; 303/140; 180/197

(56) References Cited

U.S. PATENT DOCUMENTS 5,809,434 A * 9/1998 Ashrafi et al. .................. 701/1
5,928,299 A * 7/1999 Sekine et al. .................. 701/41

FOREIGN PATENT DOCUMENTS

| JP | 2-70561 | 3/1990 |
| JP | 5-58180 | 3/1993 |

* cited by examiner

Primary Examiner—William A. Cuchlinski, Jr.
Assistant Examiner—Marthe Y. Marc-Coleman
(74) Attorney, Agent, or Firm—McGinn & Gibb, PLLC

(57) ABSTRACT

A target yaw rate setting unit of a control characteristics changing unit computes a first target yaw rate based on the radius of curvature of a curve. A target yaw rate setting unit of a braking force control unit computes a second target yaw rate based on driving conditions. When a cornering decision unit decides a turning intention, if the absolute value of the first target yaw rate is larger than the absolute value of the second target yaw rate, the second target yaw rate is corrected with the first target yaw rate, and the corrected second target yaw rate is outputted to a target yaw rate changing unit. A braking force control unit controls the braking force with the second target yaw rate corrected.

12 Claims, 8 Drawing Sheets

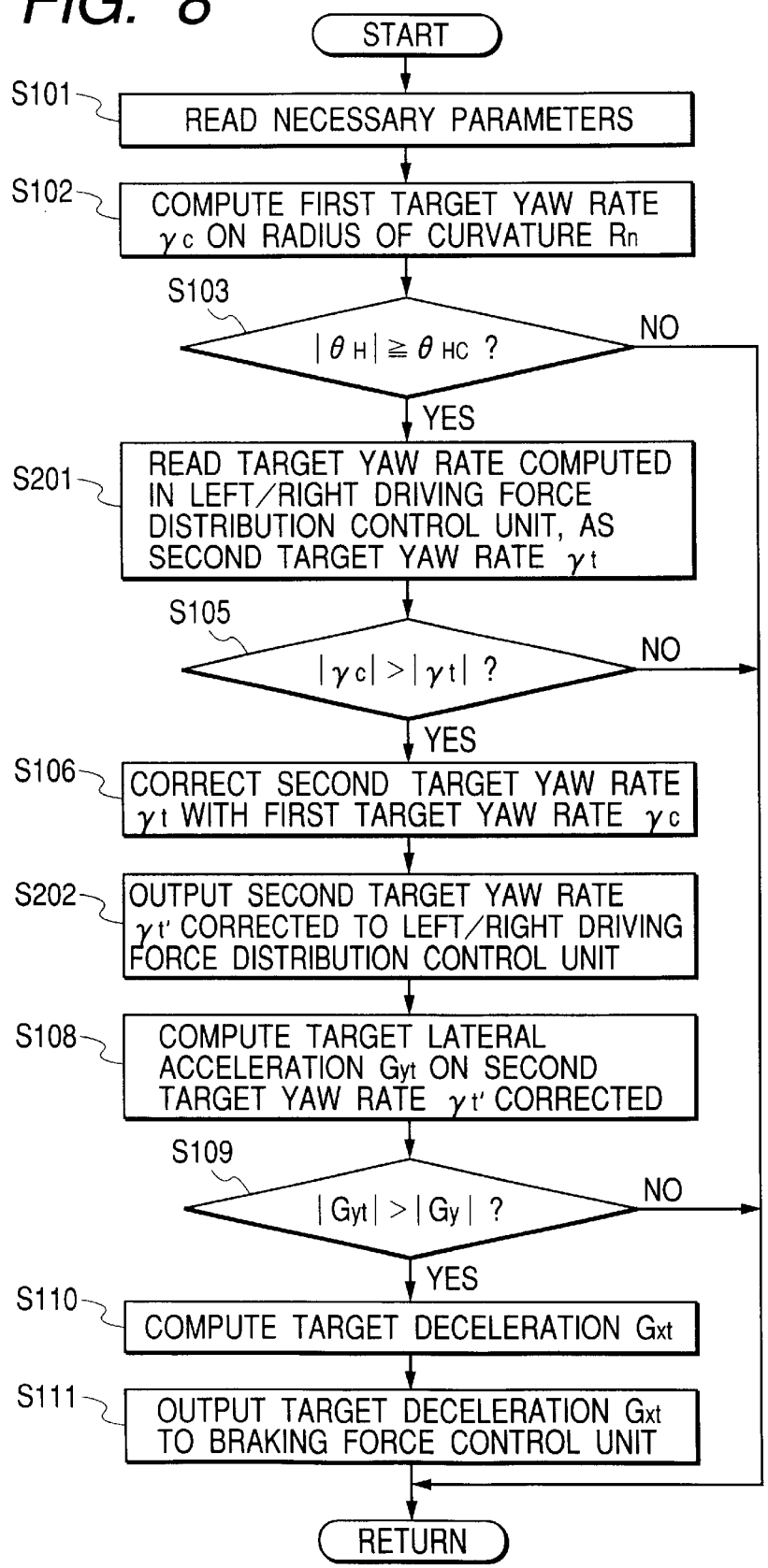

APPARATUS AND METHOD FOR CONTROLLING VEHICLE BEHAVIOR

BACKGROUND OF THE INVENTION

1. Field of the Invention

The present invention relates to a vehicle behavior control apparatus and a method thereof for applying a braking force to a predetermined brake wheel on the basis of a set target yaw rate or for establishing a yaw moment in a vehicle by making a driving force distribution variable between left and right wheels.

In recent years, there have been developed/practiced a variety of vehicle behavior control apparatus for improving a vehicle behavior and the running performance of a vehicle. In Japanese Patent Unexamined Publication No. Hei. 2-70561, for example, there is disclosed a braking force control apparatus which keeps a stability of the vehicle by comparing an actual yaw rate and a target yaw rate to control the braking force on the vehicle in accordance with the comparison result. In Japanese Patent Unexamined Publication No. Hei. 5-58180, there is disclosed a left/right driving force distribution control apparatus in which the target yaw rate is computed on the basis of the vehicle motion (running) state, and a control signal for distributing the left and right torques is outputted to a driving force transmission line while making a feedback to bring the actual yaw rate close to the target yaw rate, thereby the driving force distribution of an engine to the right and left side driving force transmission lines is adjusted so that the vehicle may be turned while moving according to the target yaw rate.

As the road surface friction coefficient $\mu$ drops or as a vehicle speed rises, however, response of the vehicle drops, thereby a driver frequently fails to respond sufficiently although required earlier control. In the prior art, this failure (retard) in the response may not be sufficed only if the vehicle faithfully (promptly) corresponds to a steering operation by the driver. Specifically, the yaw rate feedback to the target yaw rate in the prior art, which is determined by the vehicle moving state, such as the steering operation of the driver or the vehicle speed, may frequently fail to respond sufficiently to actual road conditions.

SUMMARY OF THE INVENTION

It is an object to provide a vehicle behavior control apparatus and a vehicle behavior control method capable of preventing deviations from lanes or roads due to an improper operation of a driver without any unnatural feeling, while reflecting intentions of a driver to the maximum.

The above-mentioned object can be achieved by the vehicle behavior control apparatus, according to a first aspect of the invention, comprising:

- a road shape recognizing unit for recognizing the road shape ahead of a vehicle;
- a first target yaw rate setting unit for setting a first target yaw rate on the basis of the road shape;
- a second target yaw rate setting unit for setting a second target yaw rate on the basis of driving conditions of the vehicle;
- a target yaw rate correcting unit for correcting the second target yaw rate on the basis of the first target yaw rate; and
- a braking force setting unit for applying a braking force to a selected wheel so that an actual yaw rate converges into the second target yaw rate corrected by the target yaw rate correcting unit.

The above-mentioned object can be also achieved by a vehicle behavior control apparatus, according to a second aspect of the invention, comprising:

- a road shape recognizing unit for recognizing the road shape ahead of a vehicle;
- a first target yaw rate setting unit for setting a first target yaw rate on the basis of the road shape;
- a second target yaw rate setting unit for setting a second target yaw rate on the basis of driving conditions of the vehicle;
- a turning decision unit for deciding a turning intention if a steering angle exceeds a presetted value;
- a target yaw rate correcting unit for correcting the second target yaw rate gradually toward the first target yaw rate if the turning decision unit decides the turning intention; and
- a braking force setting unit for applying a braking force to a selected wheel so that an actual yaw rate converges into the second target yaw rate corrected by the target yaw rate correcting unit.

Further, the above-mentioned object can be achieved by a vehicle behavior control apparatus, according to a third aspect of the invention, comprising:

- a road shape recognizing unit for recognizing the road shape ahead of a vehicle;
- a first target yaw rate setting unit for setting a first target yaw rate on the basis of the road shape;
- a second target yaw rate setting unit for setting a second target yaw rate on the basis of driving conditions of the vehicle;
- a target yaw rate correcting unit for correcting the second target yaw rate on the basis of the first target yaw rate; and
- a driving force distribution unit for setting the driving force distribution to left and right wheels so that an actual yaw rate converges into the second target yaw rate corrected by the target yaw rate correcting unit.

Furthermore, the above-mentioned object can be achieved by a vehicle behavior control apparatus, according to a fourth aspect of the invention, comprising:

- a road shape recognizing unit for recognizing the road shape ahead of a vehicle;
- a first target yaw rate setting unit for setting a first target yaw rate on the basis of the road shape;
- a second target yaw rate setting unit for setting a second target yaw rate on the basis of driving conditions of the vehicle;
- a turning decision unit for deciding a turning intention if a steering angle exceeds a presetted value;
- a target yaw rate correcting unit for correcting the second target yaw rate gradually toward the first target yaw rate if the turning decision unit decides the turning intention; and
- a driving force distribution unit for setting the driving force distribution to left and right wheels so that an actual yaw rate converges into the second target yaw rate corrected by the target yaw rate correcting unit.

The above-mentioned vehicle behavior control apparatus according to any of from the first aspect to fourth aspect, preferably further comprises:

- a target lateral acceleration setting unit for setting a target lateral acceleration on the basis of either the second target yaw rate corrected by the target yaw rate correcting unit or the actual yaw rate; and a deceleration control unit for making a deceleration control if the actual lateral acceleration is below the target lateral acceleration.

According to the vehicle behavior control apparatus of the first aspect of the invention, the road shape recognizing unit recognizes the road shape ahead of the vehicle, and the first target yaw rate setting unit sets the first target yaw rate on the basis of the road shape whereas the second target yaw rate setting unit sets the second target yaw rate on the basis of the driving conditions of the vehicle. Moreover, the target yaw rate correcting unit corrects the second target yaw rate on the basis of the first target yaw rate, and braking force setting unit applies the braking force to the selected wheel so that the actual yaw rate converges into the second target yaw rate corrected by the target yaw rate correcting unit. Thus, the second target yaw rate reflecting the intention of the driver is corrected with the first target yaw rate reflecting the actual road shape, and the braking force is controlled at the corrected target yaw rate. Therefore, it is possible to prevent the deviation from the lane or the road due to an improper operation of the driver without any unnatural feeling, while reflecting the intention of the driver to the maximum.

According to the vehicle behavior control apparatus of the second aspect of the invention, the road shape recognizing unit recognizes the road shape ahead of the vehicle, and the first target yaw rate setting unit sets the first target yaw rate on the basis of the road shape whereas the second target yaw rate setting unit sets the second target yaw rate on the basis of the driving conditions of the vehicle. Further, the turning decision unit decides the turning intention if the steering angle exceeds the presetted value. Moreover, the target yaw rate correcting unit corrects the second target yaw rate gradually toward the first target yaw rate if the turning decision unit decides the turning intention, and the braking force setting unit applies the braking force to the selected wheel so that the actual yaw rate converges into the second target yaw rate corrected by the target yaw rate correcting unit. Thus, the second target yaw rate reflecting the intention of the driver is corrected with the first-target yaw rate reflecting the actual road shape, and the braking force is controlled at the corrected second target yaw rate. Therefore, it is possible to prevent the deviation from the lane or the road due to an improper operation of the driver without any unnatural feeling, while reflecting the intention of the driver to the maximum.

According to the vehicle behavior control apparatus of the third aspect of the invention, the road shape recognizing unit recognizes the road shape ahead of the vehicle, and the first target yaw rate setting unit sets the first target yaw rate on the basis of the road shape whereas the second target yaw rate setting unit sets the second target yaw rate on the basis of the driving conditions of the vehicle. Moreover, the target yaw rate correcting unit corrects the second target yaw rate on the basis of the first target yaw rate, and the driving force distribution unit sets the driving force distribution to left and right wheels so that the actual yaw rate converges into the second target yaw rate corrected by the target yaw rate correcting unit. Thus, the second target yaw rate reflecting the intention of the driver is corrected with the first target yaw rate reflecting the actual road shape, and the braking force is controlled at the corrected second target yaw rate. Therefore, it is possible to prevent the deviation from the lane or the road due to an improper operation of the driver without any unnatural feeling, while reflecting the intention of the driver to the maximum.

According to the vehicle behavior control apparatus of the fourth aspect of the invention, the road shape recognizing unit recognizes the road shape ahead of the vehicle, and the first target yaw rate setting unit sets the first target yaw rate on the basis of the road shape whereas the second target yaw rate setting unit for setting the second target yaw rate on the basis of the driving conditions of the vehicle. Further, the turning decision unit decides the turning intention if the steering angle exceeds a presetted value. Moreover, the target yaw rate correcting unit corrects the second target yaw rate gradually toward the first target yaw rate if the turning decision unit decides the turning intention, and the driving force distribution unit sets the driving force distribution to left and right wheels so that the actual yaw rate converges into the second target yaw rate corrected by the target yaw rate correcting unit. Thus, the second target yaw rate reflecting the intention of the driver is corrected with the first target yaw rate reflecting the actual road shape, and the braking force is controlled at the corrected second target yaw rate. Therefore, it is possible to prevent the deviation from the lane or the road due to an improper operation of the driver without any unnatural feeling, while reflecting the intention of the driver to the maximum.

According to the vehicle behavior control apparatus of any of from the first aspect to the fourth aspect of the invention, the target lateral acceleration setting unit sets the target lateral acceleration on the basis of either the second target yaw rate corrected by the target yaw rate correcting unit or the actual yaw rate, and the deceleration control unit makes the deceleration control if the actual lateral acceleration is below the target lateral acceleration. In addition to the effects thereof from the first aspect to the fourth aspect of the invention, it is possible to prevent the deviation from the lane or road due to the improper operation of the driver, more reliably.

BRIEF DESCRIPTION OF THE DRAWINGS

FIG. 8 is the flow chart of the control characteristics changing routine.

DESCRIPTION OF THE PREFERRED EMBODIMENTS

The embodiments of the present invention will be described with reference to the accompanying drawings.

Figure 1:
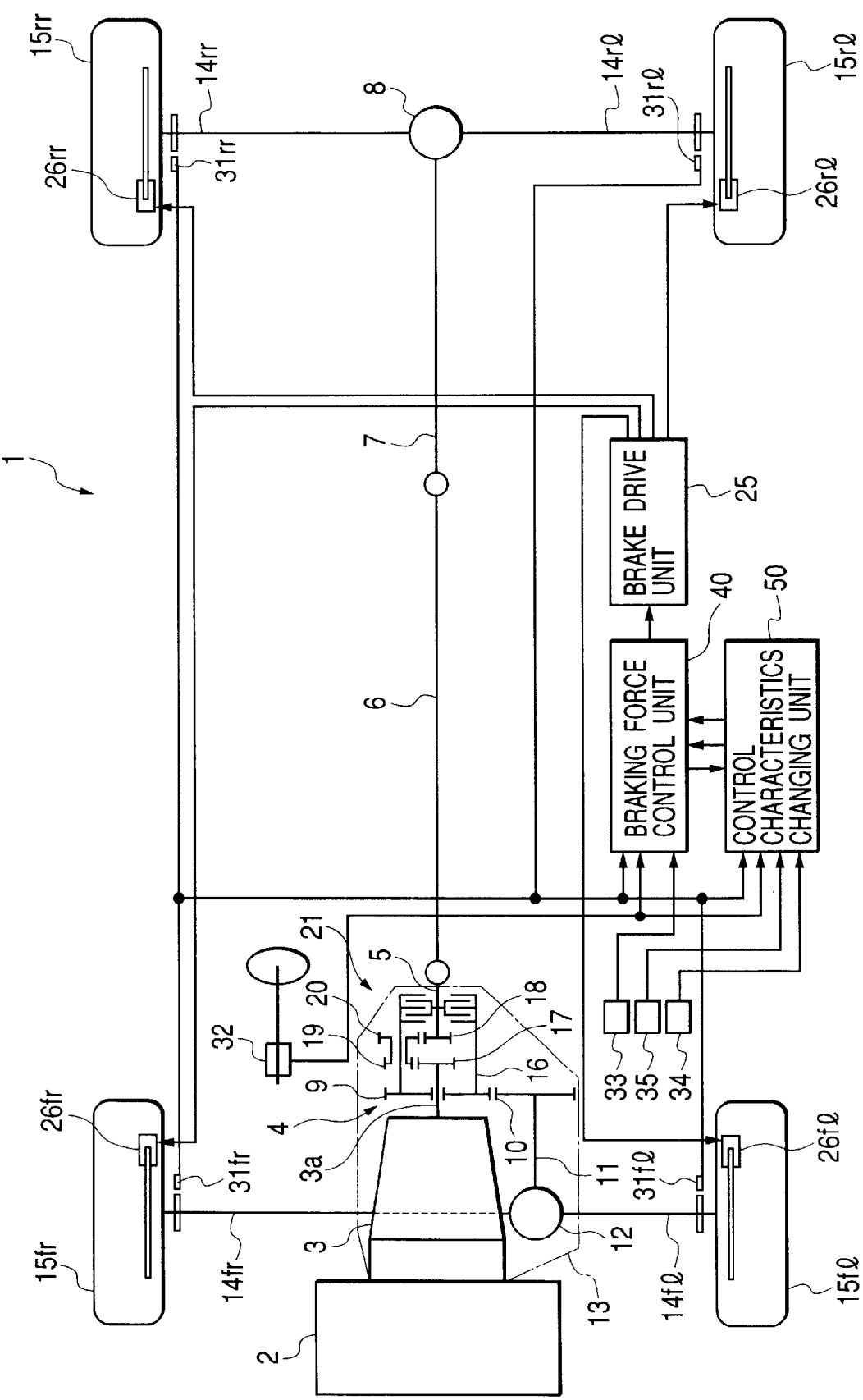
FIG. 1 is a schematic diagram for explaining a vehicle behavior control apparatus in a vehicle according to a first embodiment of the present invention.
Figure 2:
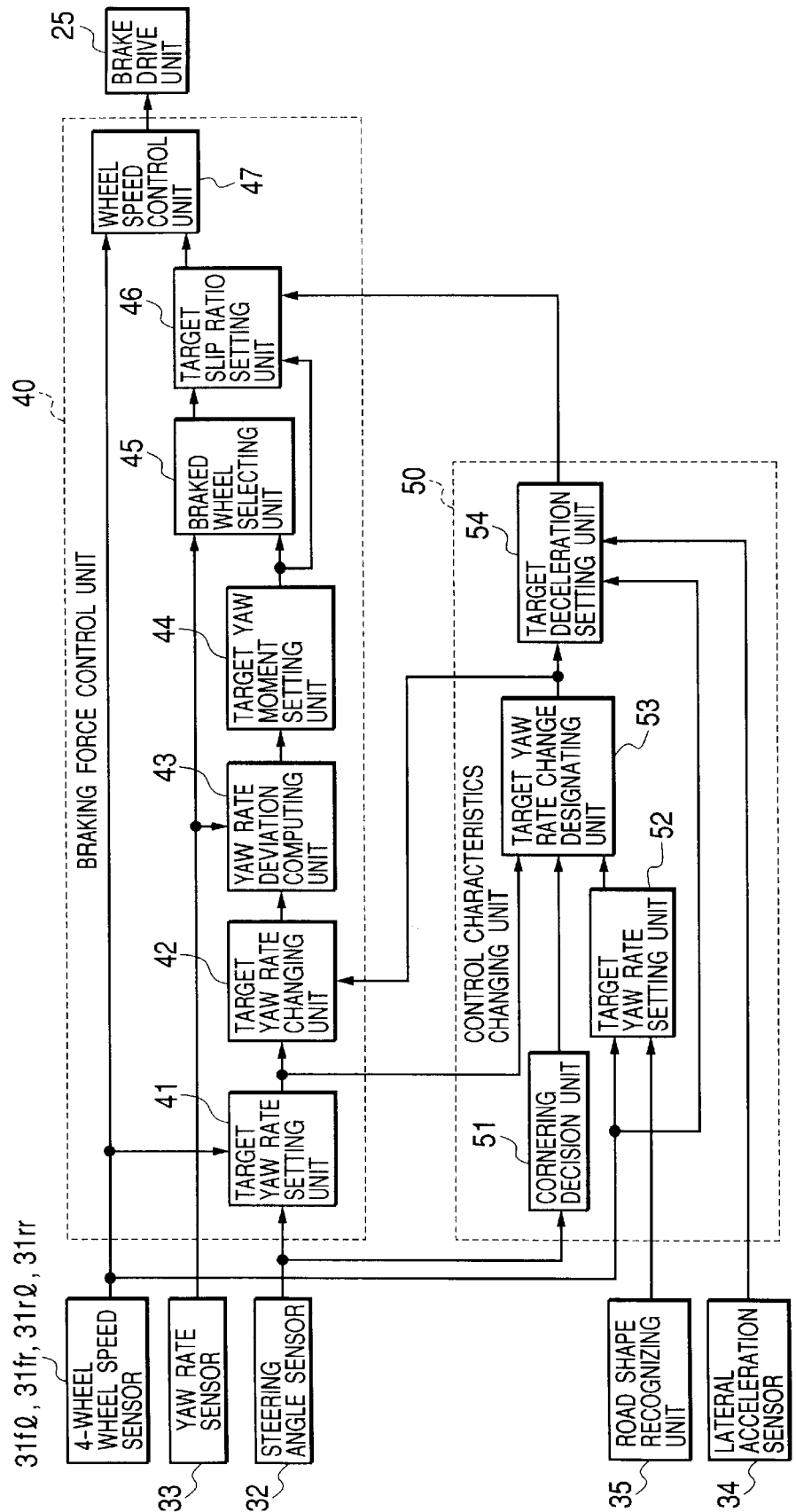
FIG. 2 is a functional block diagram of the vehicle behavior control apparatus.
Figure 3:
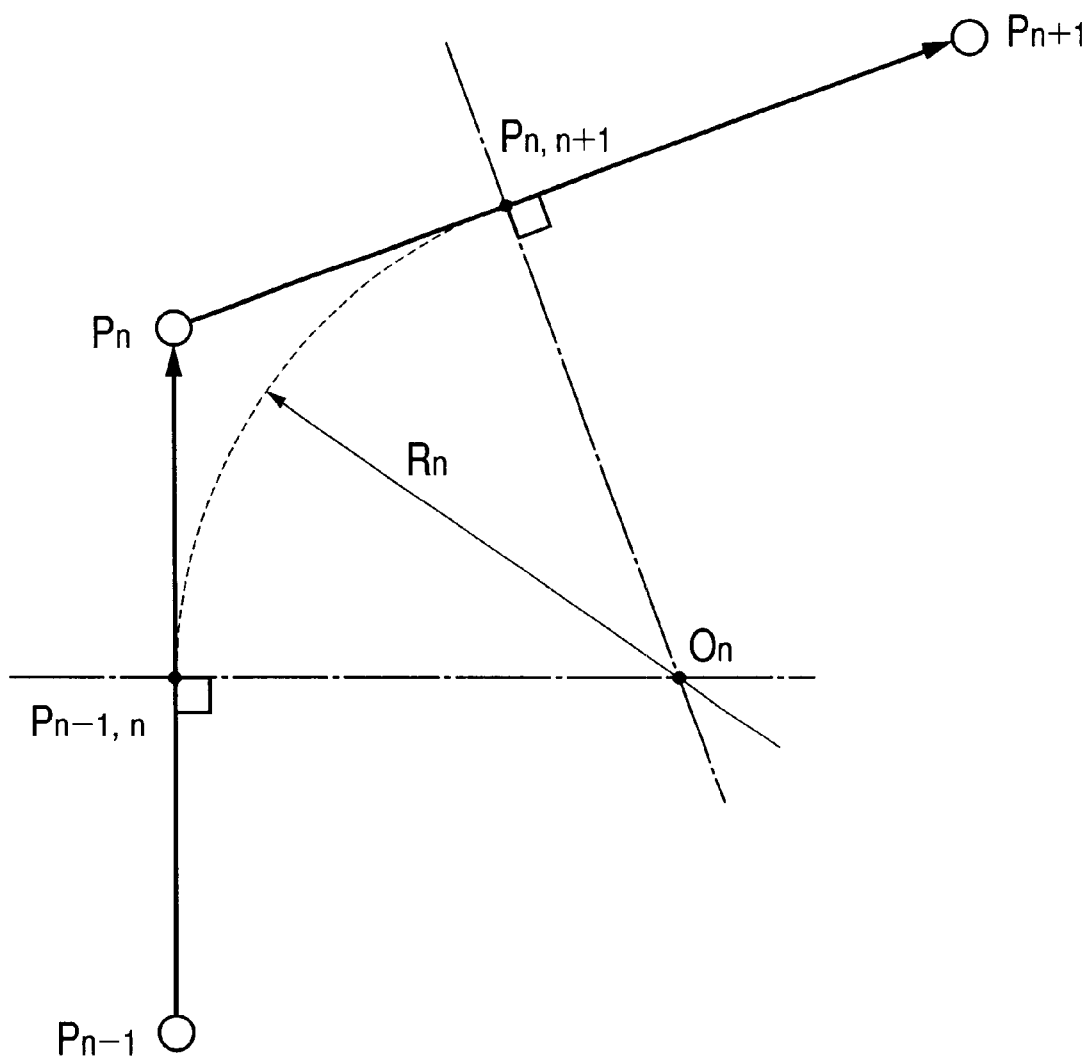
FIG. 3 is a diagram for explaining how to determine the radius of curvature of a curve.
Figure 4:
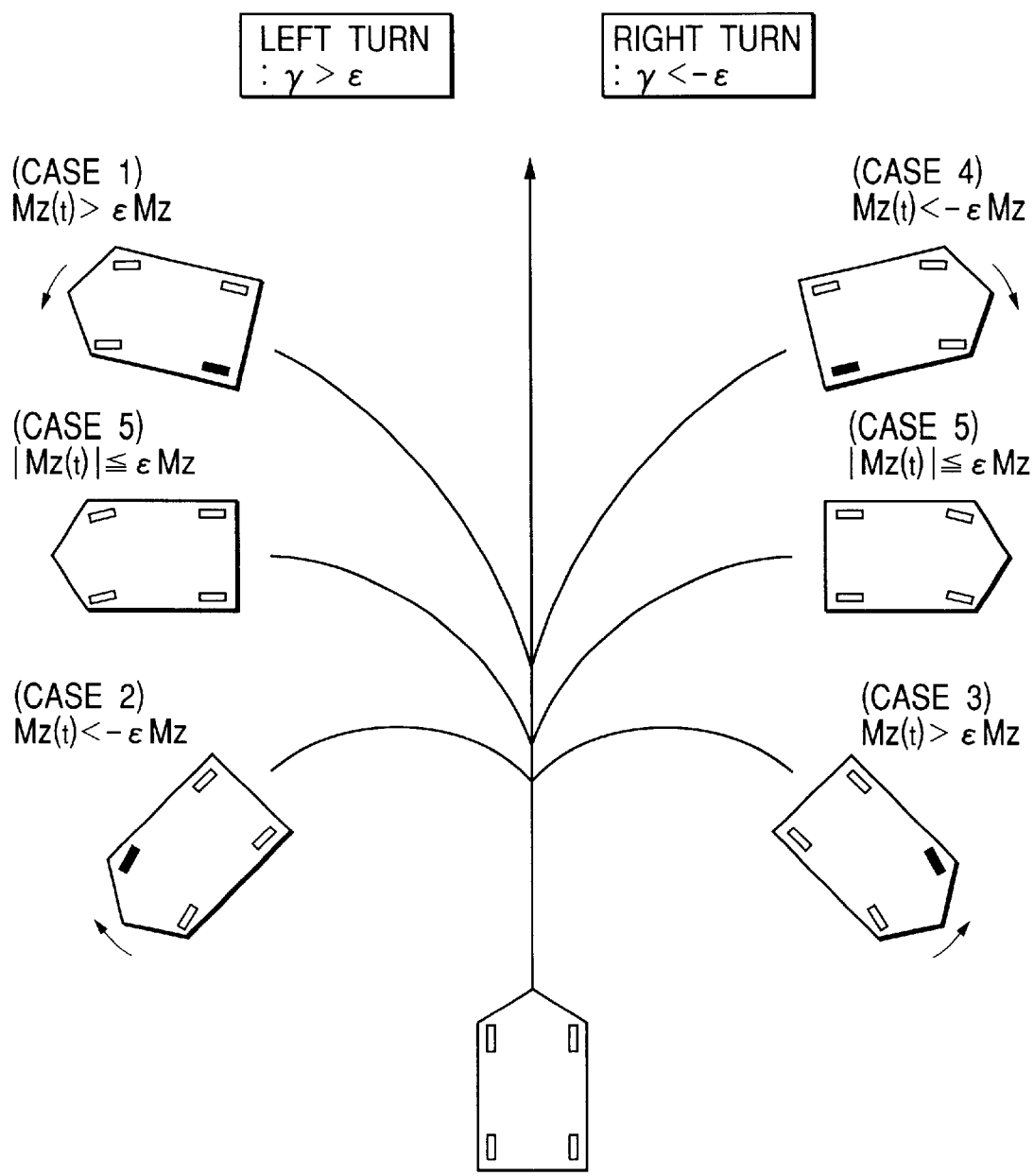
FIG. 4 is a diagram for explaining braking wheel selections in braking force controls.
Figure 5:
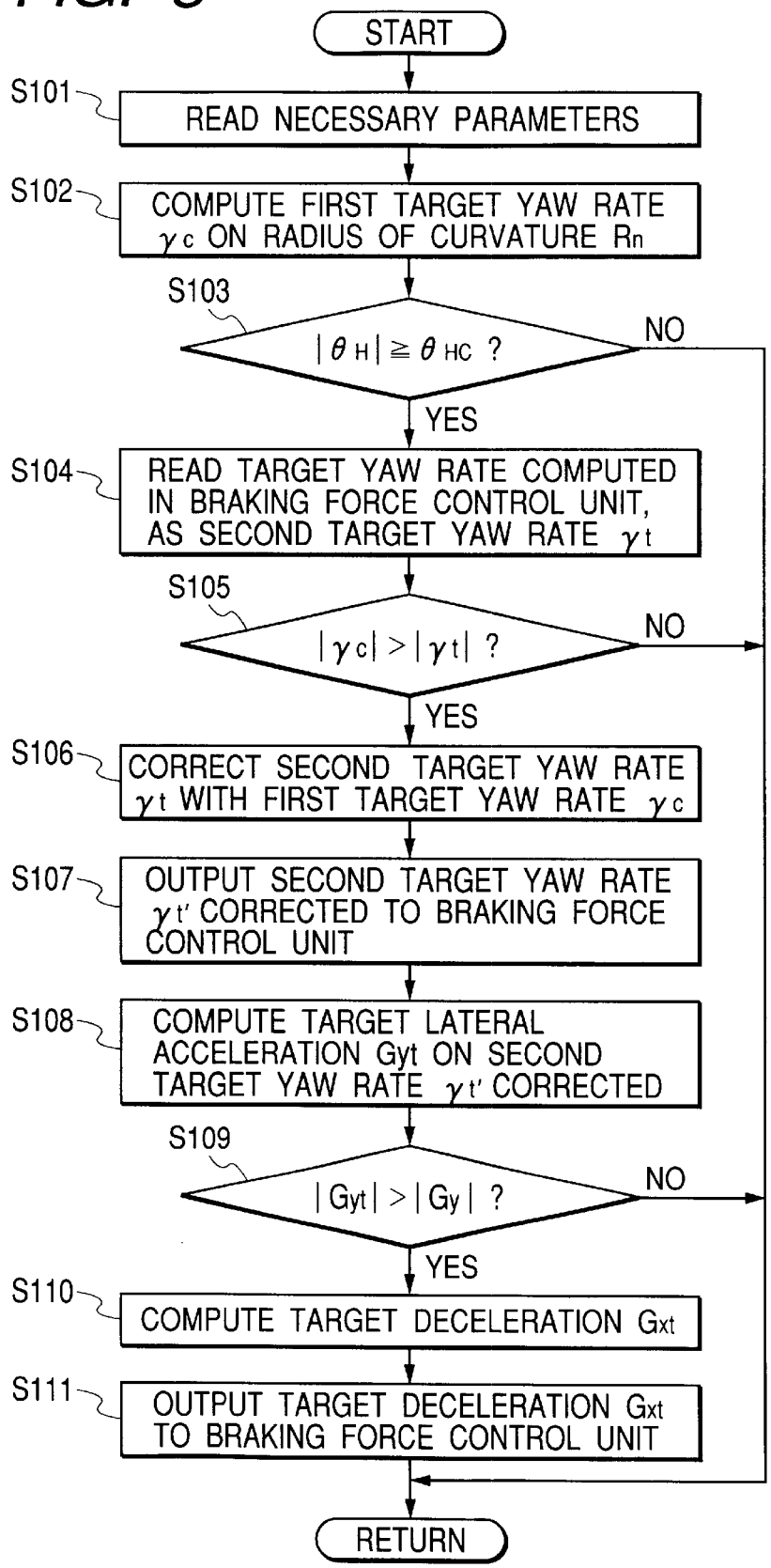
FIG. 5 is a flow chart of a control characteristics changing routine.

FIGS. 1 to 5 show a first embodiment of the invention. FIG. 1 is a schematic diagram for explaining a vehicle behavior control apparatus in a vehicle as a whole. FIG. 2 is a functional block diagram of the vehicle behavior control apparatus. FIG. 3 is a diagram for explaining how to determine a radius of curvature of a curve. FIG. 4 is a diagram for explaining braking wheel selections in braking force controls. FIG. 5 is a flow chart of a control characteristic changing routine. Here in the first Embodiment, the present invention is applied to the vehicle which is provided with a braking force control unit for improving a running stability by applying a braking force to respective wheels during cornering.

In FIG. 1, reference numeral 1 designates the vehicle, and numeral 2 designates an engine, which is arranged in the front portion of the vehicle. Driving force from the engine 2 is transmitted from an automatic transmission 3 (including a torque converter, as shown) at the back of the engine 2 through a transmission output shaft 3a to a center differential unit 4. Then, at the center differential unit 4, the driving force is distributed at a predetermined torque distribution ratio to the front and rear wheels 15fl, 15fr, 15fl, 15rr.

The driving force thus distributed from the center differential unit 4 to the rear wheels 15rl, 15rr is inputted to a rear wheel final reduction unit 8 through a rear drive shaft 5, a propeller shaft 6 and a drive pinion 7.

On the other hand, the driving force thus distributed from the center differential unit 4 to the front wheels 15fl, 15fr is inputted to a front differential unit 12 through a transfer drive gear 9, a transfer driven gear 10 and a front drive shaft 11. Here, integrally mounted in a case 13 are the automatic transmission 3, the center differential unit 4, and the front differential unit 12.

The driving force inputted to the rear wheel final reduction unit 8 is transmitted to a left rear wheel 15rl through a rear wheel left drive shaft 14rl, and to a right rear wheel 15rr through a rear wheel right drive shaft 14rr. On the other hand, the driving force inputted to the front differential unit 12 is transmitted to a left front wheel 15fl through a front wheel left drive shaft 14fl, and to a right front wheel 15fr through a front wheel right drive shaft 14fr.

In the back of the case 13, there is disposed the center differential unit 4. A carrier 16 is rotatably housed in the center differential unit 4. The transmission output shaft 3a is rotatably inserted from the front of the carrier 16 into the center differential unit 4. The rear drive shaft 5 is rotatably inserted from the back of the carrier 16 into the center differential unit 4.

A first sun gear 17 having a larger diameter is fixed on the rear end portion of the transmission output shaft 3a on the input side. A second sun gear 18 having a smaller diameter is fixed on the front end portion of the rear drive shaft 5 for the output to the rear wheels 15rl, 15rr. The first sun gear 17 and the second sun gear 18 are housed in the carrier 16.

The first sun gear 17 meshes with a first pinion 19 of a smaller diameter to form a first gear train. The second sun gear 18 meshes with a second pinion 20 (larger diameter side) to form a second gear train. The first pinion 19 and the second pinion 20 are integrated to provide a plurality of pairs (e.g., three pairs) of pinions which are rotatably borne on the carrier 16. To the front end of this carrier 16, there is connected the transfer drive gear 9 so that the output power is transmitted from the carrier 16 to the front wheels 15fl, 15fr.

In other words, the center differential unit 4 is included in such a complex planetary gear type without a ring gear that the driving force from the transmission output shaft 3a is transmitted to the first sun gear 17 and then is outputted to the rear drive shaft 5 through the second sun gear 18, and the driving force from the transmission output shaft 3a is also transmitted from the carrier 16 to the front drive shaft 11 through the transfer drive gear 9 and the transfer driven gear 10.

Moreover, the center differential unit 4 of the complex planetary gear type is given a differential function by setting proper tooth numbers of the first and second sun gears 17 and 18 and the first and second pinions 19 and 20 arranged around the first second sun gears 17 and 18.

Further, the reference torque distribution can be setted to a desired distribution (e.g., a larger torque distribution to the rear wheels 15rl, 15rr) by setting the proper meshing pitch circle diameters of the first and second sun gears 17 and 18 and the first and second pinions 19 and 20.

The first and second sun gears 17 and 18 and the first and second pinions 19 and 20 are exemplified by helical gears to make different the helix angles of the first gear train and the second gear train so that the thrust is left without offsetting the thrust thereby to establish a frictional torque between the pinion end faces. The center differential unit 4 has the differential limiting function by causing the resultant force of the separation and the tangential load from meshing relations to act on the first and second pinions 19 and 20 and the surface of the stem of the carrier for pivoting the first and second pinions 19 and 20, thereby to establish differential limiting torque function which is proportional to the input torque.

Between the carrier 16 and the rear drive shaft 5 of the center differential unit 4, there is interposed a transfer clutch 21 which adopts the hydraulic multi-disc clutch for making the driving force distribution between the front and rear wheels 15fl, 15fr, 15rl, 15rr variable. By controlling the applying force of the transfer clutch 21, the torque distribution between the front and rear wheels 15fl, 15fr, 15rl, 15rr can be variably controlled within a range from that of the direct connection of 50:50 for the 4WD to that of the center differential unit 4.

Numeral 25 designates a brake drive unit of the vehicle 1. The master cylinder (not shown) connected to a brake pedal operated by the driver is connected to the brake drive unit 25. As the driver operates the brake pedal, a brake pressure is introduced by the master cylinder through the brake drive unit 25 to the individual wheel cylinders (i.e., a left front-wheel wheel cylinder 26fl, a right front-wheel wheel cylinder 26fr, a left rear-wheel wheel cylinder 26rl and a right rear-wheel wheel cylinder 26rr) of the four wheels 15fl, 15fr, 15rl and 15rr so that the four wheels are braked.

The brake drive unit 25 is a hydraulic unit which is equipped with a pressure source, a debooster valve, a booster valve and so on. The brake drive unit 25 can not only effect the aforementioned brake operations by the driver but also introduce the brake pressure freely to the individual wheel cylinders 26fl, 26fr, 26rl and 26rr independently in response to an input signal from a later-described braking force control unit 40.

The vehicle 1 is provided with a control characteristics changing unit 50. The control characteristics changing unit 50 can correct, if necessary, either a target yaw rate (or a first target yaw rate) computed by the braking force control unit 40 or a target deceleration set by the braking force control unit 40.

The vehicle 1 is also provided with individual sensors for detecting input parameters, as required for the braking force control unit 40 and the control characteristics changing unit 50. Specifically, the wheel speeds of the individual wheels 15fl, 15fr, 15rl and 15rr are detected by wheel speed sensors 31fl, 31fr, 31rl and 31rr, and a steering angle θH is detected by a steering angle sensor 32. The detected values are inputted to the braking force control unit 40 and the control characteristics changing unit 50. An actual yaw rate γ is detected by a yaw rate sensor 33 and is inputted to the braking force control unit 40. An actual lateral acceleration Gy is detected by a lateral acceleration sensor 34, and a road shape (e.g., a radius Rn of curvature of a front curve) in front of the vehicle 1 is detected by a road shape recognizing unit 35. These detected values are inputted to the control characteristics changing unit 50.

Here, the road shape recognizing unit 35 is provided as road shape recognizing means for determining the curve radius Rn of the road on the basis of the point data of the road, as inputted from a navigation device, e.g., the technique disclosed by us in Japanese Patent Unexamined Publication No. Hei. 11-2528. This method will be briefly described in the following.

From the point data inputted from the navigation device, e.g., three points on the road within the range of about 100 meters in front are read sequentially (from the vehicle) as a first point Pn−1, a second point Pn and a third point Pn+1, as illustrated in FIG. 3. Here, the curve is represented by the point Pn. Therefore, the individual data are calculated for the curve of a point P1 from points P0, P1 and P2, for the curve of the point P2 from the points P1, P2 and P3, - - -, and for the curve of the point Pn from the points Pn−1, Pn and Pn+1.

In the curve of the point Pn, the distance of the straight line joining the first point Pn−1 and the second point Pn is computed on the basis of the positional information of the first point Pn−1 and the second point Pn, and the distance of the straight line joining the second point Pn and the third point Pn+1 is computed on the basis of the second point Pn and the third point Pn+1.

Then, the straight distance joining the first point Pn−1 and the second point Pn and the straight distance joining the second point Pn and the third point Pn+1 are compared to decide which of them is longer or shorter. As a result, on the basis of the individual data (including the position and the distance) of the shorter straight line, the half distance of the shorter straight distance is computed, and the midpoint position on the shorter straight line is determined. Here, the shorter straight line is exemplified by the straight line joining the first point Pn−1 and the second point Pn, and the midpoint is expressed by Pn−1,n.

From the individual data (including the position and the distance) of the longer straight line and the data of the half distance of the shorter straight distance, on the other hand, a midpoint equidistance point is determined at the position at a half distance of the shorter straight distance on the longer straight line from the second point. Here, the longer straight line is exemplified by the straight line joining the second point Pn and the third point Pn+1, and the midpoint equidistance point is expressed by Pn,n+1.

On the basis of the positional data of the midpoint Pn−1,n and the positional data of the midpoint equidistance point Pn,n+1, moreover, the point of intersection between a straight line perpendicular at the midpoint Pn−1,n to the shorter straight line (as expressed by Pn−1 Pn) and a straight line perpendicular at the midpoint equidistance point Pn,n+1 to the longer straight line (as expressed by Pn Pn+1) is determined as a center position. One of the curves on the road being traveled, so that the curve radius Rn is computed on the basis of that curve center position. The curve radius Rn thus computed is further corrected with the road width information and is inputted to the control characteristics changing unit 50.

Next, the structures of the braking force control unit 40 and the control characteristics changing unit 50 will be described with reference to the functional block diagram of FIG. 2.

The braking force control unit 40 mainly includes a target yaw rate setting unit 41, a target yaw rate changing unit 42, a yaw rate deviation computing unit 43, a target yaw moment setting unit 44, a brake wheel selecting unit 45, a target slip ratio setting unit 46 and a wheel speed control unit 47. The control characteristics changing unit 50 mainly includes a cornering decision unit 51, a target yaw rate setting unit 52, a target yaw rate change designating unit 53 and a target deceleration setting unit 54.

In the target yaw rate setting unit 41 of the braking force control unit 40, the steering angle θH is inputted from the steering angle sensor 32, and the wheel speeds of the four wheels 15$fl$, 15$fr$, 15$rl$, 15$rr$ are inputted from the four-wheel wheel speed sensors 31$fl$, 31$fr$, 31$rl$ and 31$rr$. Then, the target yaw rate setting unit 41 computes a target yaw rate γt on the basis of those driving conditions and outputs signals of the target yaw rate γt to the target yaw rate changing unit 42 and the target yaw rate change designating unit 53 of the control characteristics changing unit 50. In short, the target yaw rate γt is determined as a second target yaw rate, and the target yaw rate setting unit 41 is provided as second target yaw rate setting unit.

Here, the second target yaw rate γt is computed, for example, by the following Formula (1):

$$\gamma t = (1/(1+A \cdot V^2)) \cdot (V/L) \cdot (\theta H/n) \quad (1)$$

wherein: A designates a stability factor indicating the steering characteristics intrinsic to the vehicle; V designates a vehicle speed (e.g., an average of the four-wheel vehicle speeds); L designates a wheel base; and n designates a steering gear ratio.

In the target yaw rate changing unit 42, the second target yaw rate γt is inputted from the target yaw rate setting unit 41, and a second target yaw rate γt' corrected is inputted, if necessary, from the target yaw rate change designating unit 53 of the control characteristics changing unit 50. When the corrected second target yaw rate γt' is inputted from the target yaw rate change designating unit 53, it is changed (or used) as the second target yaw rate γt to be used for the braking force control and is outputted to the yaw rate deviation computing unit 43.

In the yaw rate deviation computing unit 43, the actual yaw rate γ is inputted from the yaw rate sensor 33, and the second target yaw rate γ t is inputted from the target yaw rate changing unit 42. The yaw rate deviation computing unit 43 computes a yaw rate deviation Δγ from the following Formula (2) and outputs it to the target yaw moment setting unit 44:

$$\Delta\gamma = \gamma - \gamma t \quad (2)$$

In the target yaw moment setting unit 44, the yaw rate deviation Δγ is inputted from the yaw rate deviation computing unit 43. The target yaw moment setting unit 44 computes a target yaw moment Mz(t) from the following Formula (3) and outputs the target yaw moment Mz(t) signals to the brake wheel selecting unit 45 and the target slip ratio setting unit 46:

$$Mz(t) - k3 \cdot \Delta\gamma \quad (3)$$

wherein k3 designates a control gain.

The brake wheel selecting unit 45 decides the turning direction of the vehicle in terms of the actual yaw rate γ from the yaw rate sensor 33. Then, the selecting unit 45 selects the turning inner rear wheel as the brake force applying wheel, to which the braking force is applied, when the target yaw moment Mz(t) calculated by the target yaw moment setting unit 44 is in the same direction as the turning direction. When the target yaw moment Mz(t) is in the opposite direction to the turning direction, the selecting unit 45 selects the turning outer front wheel as the wheel, to which the braking force is applied. These combinations in the brake wheel selecting unit 45 are set as follows. Here, both the actual yaw rate γ and the target yaw moment Mz(t) are signed by "+" in the leftward turning direction and by "−" in the rightward turning direction. In order to decide the straight running state of the vehicle, letter is set as the positive value which is determined about zero in advance by experiments or computations. In order to decide that the target yaw moment Mz(t) is about zero at the turning time, the value ε Mz is set to the positive value of about zero determined in advance by experiments or computations.

(Case 1): γ>ε and Mz(t)>εMz, and leftward turning in understeer left rear wheel braked;

(Case 2): γ>ε and Mz(t)<−εMz, and leftward turning in oversteer right front wheel braked;

(Case 3): γ<ε and Mz(t)>εMz, and rightward turning in oversteer left front wheel braked;

(Case 4): γ<ε and Mz(t)<−εMz, and rightward turning in understeer right rear wheel braked; and (Case 5): generally straight run with |γ|≤ε, or turning with |Mz(t)|≤εMz, no braking with no brake wheel selected (FIG. 4).

In the target slip ratio setting unit 46, the selection result of the brake wheel is inputted from the brake wheel selecting unit 45, and the target yaw moment Mz(t) is inputted from the target yaw moment setting unit 44. Further, a target deceleration Gxt is inputted in the target slip ratio setting unit 46, if necessary, from the target deceleration setting unit 54 of the control characteristics changing unit 50.

A target slip ratio λt is computed by the following Formula (4) and is outputted to the vehicle speed control unit 47:

$$\lambda t = Ft/Kb \tag{4}$$

wherein: Kb designate a braking stiffness, as obtained from the relations of the braking force to the slip ratio of the tire; and Ft designates a target braking force. The target braking force Ft is computed by the following Formula (5) for a tread d:

$$Ft = Mz(t)/(d/2) \tag{5}$$

When the target deceleration Gxt is inputted from the target deceleration setting unit 54 of the control characteristics changing unit 50, the target slip ratio setting unit 46 corrects the target slip ratio λt, as expressed by the following formulas (10) and (11) by using the target deceleration Gxt, and outputs the signals of the target deceleration Gxt to the wheel speed control unit 47:

Target Braking Force Ftf of Front Wheel=(½)·Cbf·m·Gxt (6)

Target Braking Force Ftr of Rear Wheel=(½)·(1−Cbf)·m·Gxt (7)

wherein Cbf designates a front/rear braking force distribution ratio (0 to 1), and m designates a vehicle mass.

Target Slip Ratio Correction Δλf of Front Wheel=Ftf/Kb (8)

Target Slip Ratio Correction Δλr of Rear Wheel=Ftr/Kb (9)

Corrected Front Wheel Target Slip Ratio λtf'=λt+Δλf (10)

Corrected Rear Wheel Target Slip Ratio λtr'=λt+Δλr (11)

In the wheel speed control unit 47, the wheel speeds of the four wheels 15fl, 15fr, 15rl, 15rr are inputted from the four-wheel wheel speed sensors 31fl, 31fr, 31rl and 31rr, and either the target slip ratio λt of the selected brake wheel or the corrected target slip ratios λtf' and λtr' of the front and rear wheels 15fl, 15fr, 15rl, 15rr are inputted from the target slip ratio setting unit 46. The wheel speed control unit 47 converts the braking force, as necessary for achieving those target slip ratios, and outputs thereof to the brake drive unit 25.

In the control characteristics changing unit 50, the cornering decision unit 51 receives the steering angle θH from the steering angle sensor 32 and decides whether or not the steering angle θH is more than a presetted value θHc. The setted value θHc is a value for deciding whether or not the driver has a will for cornering. When the steering angle θH is equal to or more than the set value θHc, it is decided that the driver has the cornering will. When the steering angle θH is smaller than the set value θHc, it is decided that the driver has no cornering will. The decision result is outputted to the target yaw rate change designating unit 53. In short, the cornering decision unit 51 is provided as a turning decision unit.

In the target yaw rate setting unit 52, the wheel speeds of the four wheels 15fl, 15fr, 15rl, 15rr are inputted from the four-wheel wheel speed sensors 31fl, 31fr, 31rl and 31rr, and the curve radius Rn is inputted from the road shape recognizing unit 35. The target yaw rate setting unit 52 computes a target yaw rate γc by the following Formula (12) and outputs thereof to the target yaw rate change designating unit 53. In other words, the target yaw rate γc is determined as the first target yaw rate, and the target yaw rate setting unit 52 is provided first target yaw rate setting unit.

$$\gamma c = V/Rn \tag{12}$$

In the target yaw rate change designating unit 53, the result (in terms of a flag, for example) of the cornering decision is inputted from the cornering decision unit 51, the first target yaw rate γc is inputted from the target yaw rate setting unit 52, and the second target yaw rate γt is inputted from the target yaw rate setting unit 41 of the braking force control unit 40. When it is decided that the driver has the cornering will, the first target yaw rate γc and the second target yaw rate γt are compared in their absolute values. When the absolute value |γc| of the first target yaw rate γc is larger than the absolute value |γt| of the second target yaw rate γt, the increasing/decreasing correction is made to bring the second target yaw rate γt closer to the first target yaw rate γc, and the corrected second target yaw rate γt' is outputted to the target yaw rate changing unit 42 of the braking force control unit 40. In short, the target yaw rate change designating unit 53 is provided as a target yaw rate correcting unit.

Here, the second target yaw rate γt is corrected with the first target yaw rate γc, as specified by the following Formula (13):

$$\gamma t' = \kappa 1 \cdot \gamma t + (1 - \kappa 1) \cdot \gamma c \tag{13}$$

The constant κ1 for weighing the second target yaw rate γt determined from the driving conditions of the driver and the first target yaw rate γc determined from the curve in front of the vehicle 1 is determined as 0<κ1<1 by reflecting the driving operation of the driver. At this time, the constant κ1 may be gradually setted from 1 as the correction starts (or may be gradually set to the first target yaw rate γc). When the deviation between the second target yaw rate γt and the first target yaw rate γc is smaller than the presetted value, the constant κ1 may be gradually increased to 1. When the information (e.g., the curve radius Rn) necessary for the control cannot be obtained or when the driver makes the steering apparently different from the road shape so that the deviation between the second target yaw rate γt and the first target yaw rate γc exceeds a predetermined upper limit, the constant κ1 may be gradually increased to 1 so as to prevent any abrupt change in the vehicle behavior.

In the target deceleration setting unit 54, the wheel speeds of the four wheels 15fl, 15fr, 15rl, 15rr are inputted from the four-wheel wheel speed sensors 31fl, 31fr, 31rl and 31rr, the actual lateral acceleration Gy is inputted from the lateral acceleration sensor 34, and the corrected second target yaw rate γt' is inputted from the target yaw rate change designating unit 53. The target deceleration setting unit 54 computes a target lateral acceleration Gyt by the following Formula (14). When the actual lateral acceleration Gy is smaller than the computed target lateral acceleration Gyt, it is decided that a sufficient control is not made only by the braking force control unit 40, and the target deceleration Gxt is computed by the following Formula (15) and is outputted to the target slip ratio setting unit 46 of the braking force control unit 40.

$$Gyt = \gamma t' \cdot V \quad (14)$$

$$Gxt = \kappa 2 \cdot (|Gyt| - |Gy|) \quad (15)$$

wherein κ2 is 0<κ2 ≦1 and a coefficient for setting the deceleration according to the shortage of the actual lateral acceleration Gy. Here, the coefficient κ2 may be brought closer to 1 or returned to 0 by deciding the driver will or by comparing the second target yaw rate γt and the first target yaw rate γc. On a low friction coefficient μ road, for example, the actual lateral acceleration Gy may be extremely smaller than the target deceleration Gxt, but the coefficient κ2 is then set smaller than 1. The target lateral acceleration Gyt of the formula (14) may be computed by using the actual yaw rate γ:

$$Gyt = \gamma \cdot V \quad (14)'$$

Thus, the target deceleration setting unit 54 has functions as target lateral acceleration setting unit and deceleration control unit. The braking force setting unit has the target yaw rate changing unit 42, the yaw rate deviation computing unit 43, the target yaw moment setting unit 44, the brake wheel selecting unit 45, the target slip ratio setting unit 46 and the wheel speed control unit 47 of the braking force control unit 40.

Next, FIG. 5 is a flow chart showing a control characteristics changing routine to be executed in the control characteristics changing unit 50. First of all, at Step (as will be abbreviated into "S") 101, the necessary parameters are read in, and the routine advances to S102, at which the first target yaw rate γc based on the curve radius Rn is computed in the target yaw rate setting unit 52 by the Formula (12).

Then, the routine advances to S103, at which it is decided in the cornering decision unit 51 whether or not the steering angle θH is equal to or larger than the presetted value θHc. If the steering angle θH is equal to the set value θHc, it is decided that the driver has the cornering will, and the routine advances to S104. If the steering angle θH is smaller than the set value θHc, it is decided that the driver does not have the cornering will, and the operations leave the program.

If the routine decides the cornering will at S103 and advances to S104, the routine reads the second target yaw rate γt based on the driving conditions computed at the target yaw rate setting unit 41 of the braking force control unit 40, and advances to S105.

At S105, the first target yaw rate γc and the second target yaw rate γt are compared in their absolute values. If the absolute value |γc| of the first target yaw rate γc is larger than the absolute value |γt| of the second target yaw rate γt, it is decided that the operation amount of the driver shorts for turning the actual road shape (curve), and the routine advances to S106. If the absolute value |γc| of the first target yaw rate γc is no more than the absolute value |γt| of the second target yaw rate γt, it is decided that the operation amount of the driver is enough, and the routine leaves the program.

If the routine decides it at S105 that the operation of the driver shorts for turning the curve and advances to S106, the second target yaw rate γt is corrected by the Formula (13) to increase/decrease to the first target yaw rate γc, and the routine advances to S107, at which this corrected second target yaw rate γt' is outputted to the target yaw rate changing unit 42 of the braking force control unit 40. In short, the operations of S104 to S107 are done (executed) at the target yaw rate designating unit 53.

After that, the routine advances to S108, at which the target lateral acceleration Gyt is computed by the Formula (14) on the basis of the corrected second target yaw rate γt', and the routine further advances to S109.

At S109, the absolute value |Gyt| of the target lateral acceleration Gyt and the absolute value |Gy| of the actual lateral acceleration Gy are compared. If the absolute value |Gyt| of the target lateral acceleration Gyt is larger than the absolute value |Gy| of the actual lateral acceleration Gy, it is decided that a sufficient control is not made only by the braking force control unit 40, and the routine advances to S110, at which the target deceleration Gxt is computed by the Formula (15). At S111, the target deceleration Gxt is outputted to the target slip ratio setting unit 46, and the routine leaves the program. If it is decided at S109 that the absolute value |Gyt| of the target lateral acceleration Gyt is equal to or less than the absolute value |GY| of the actual lateral acceleration Gy, on the other hand, the routine leaves the program without any further operation. In short, the operations of S108 to S111 are done (executed) at the target deceleration setting unit 54.

Thus, according to the first embodiment, the first target yaw rate γc based on the curve radius Rn and the second target yaw rate γt based on the driving conditions are compared. If the absolute value |γc| of the first target yaw rate γc is larger than the absolute value |γt| of the second target yaw rate γt, it is decided that the operation of the driver is insufficient, and the control is made to approach the first target yaw rate γc. Therefore, the deviation from the lane or the road due to an improper operation of the driver can be prevented without any unnatural feeling by reflecting the intention of the driver to the maximum.

At this time, the absolute value |Gyt| of the target lateral acceleration Gyt and the absolute value |Gy| of the actual lateral acceleration Gy are compared. If the absolute value |Gyt| of the target lateral acceleration Gyt is larger than the absolute value |Gy| of the actual lateral acceleration Gy, it is decided that a sufficient control is not made only by the braking force control unit 40, and the target slip ratio λt of the braking force control unit 40 is corrected. Therefore, it is possible to prevent the deviation from the lane or the road due to the improper operation of the driver more reliably.

Figure 6:
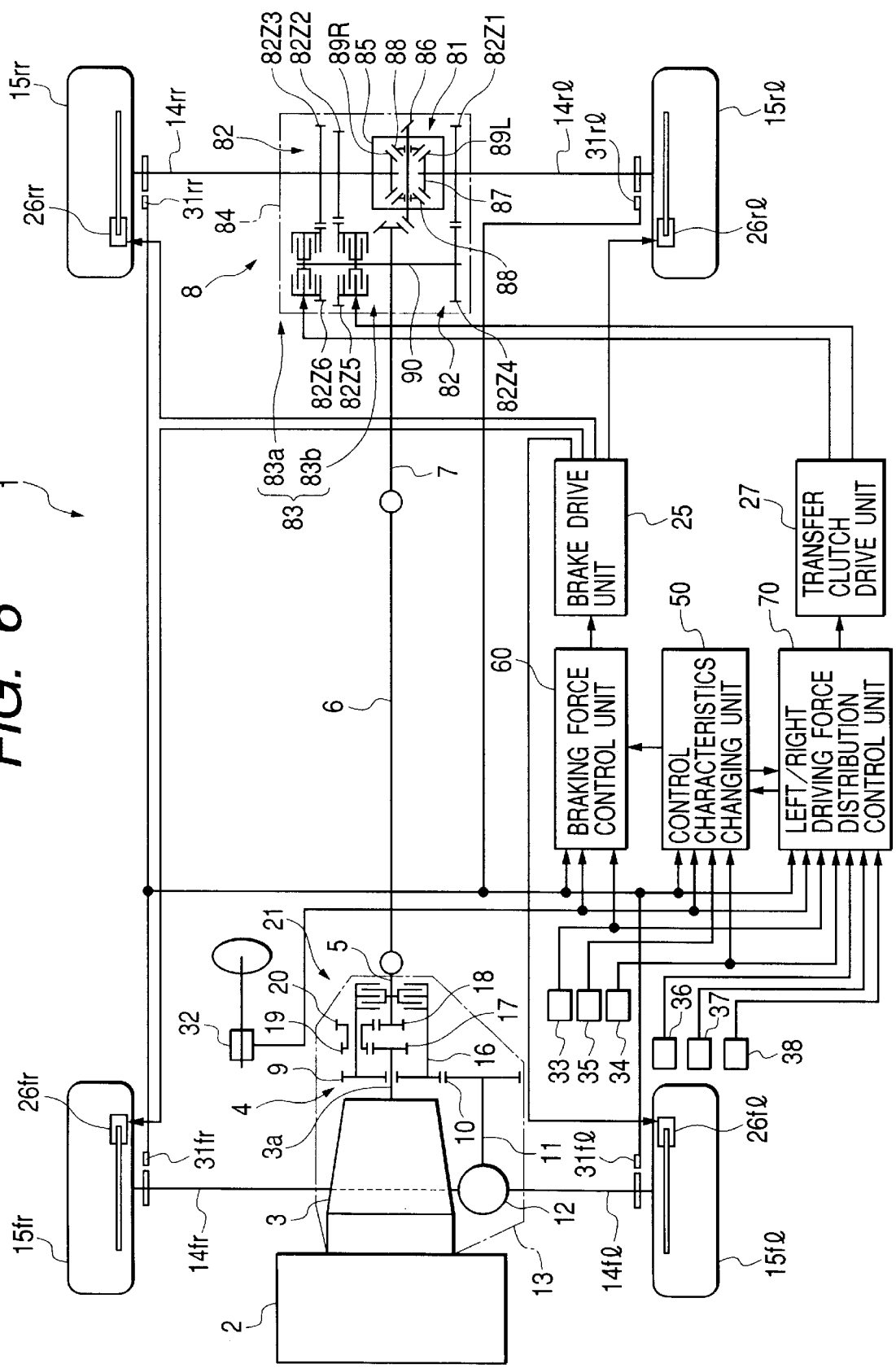
FIG. 6 is a schematic diagram for explaining the vehicle behavior control apparatus according to a second embodiment of the present invention.
Figure 7:
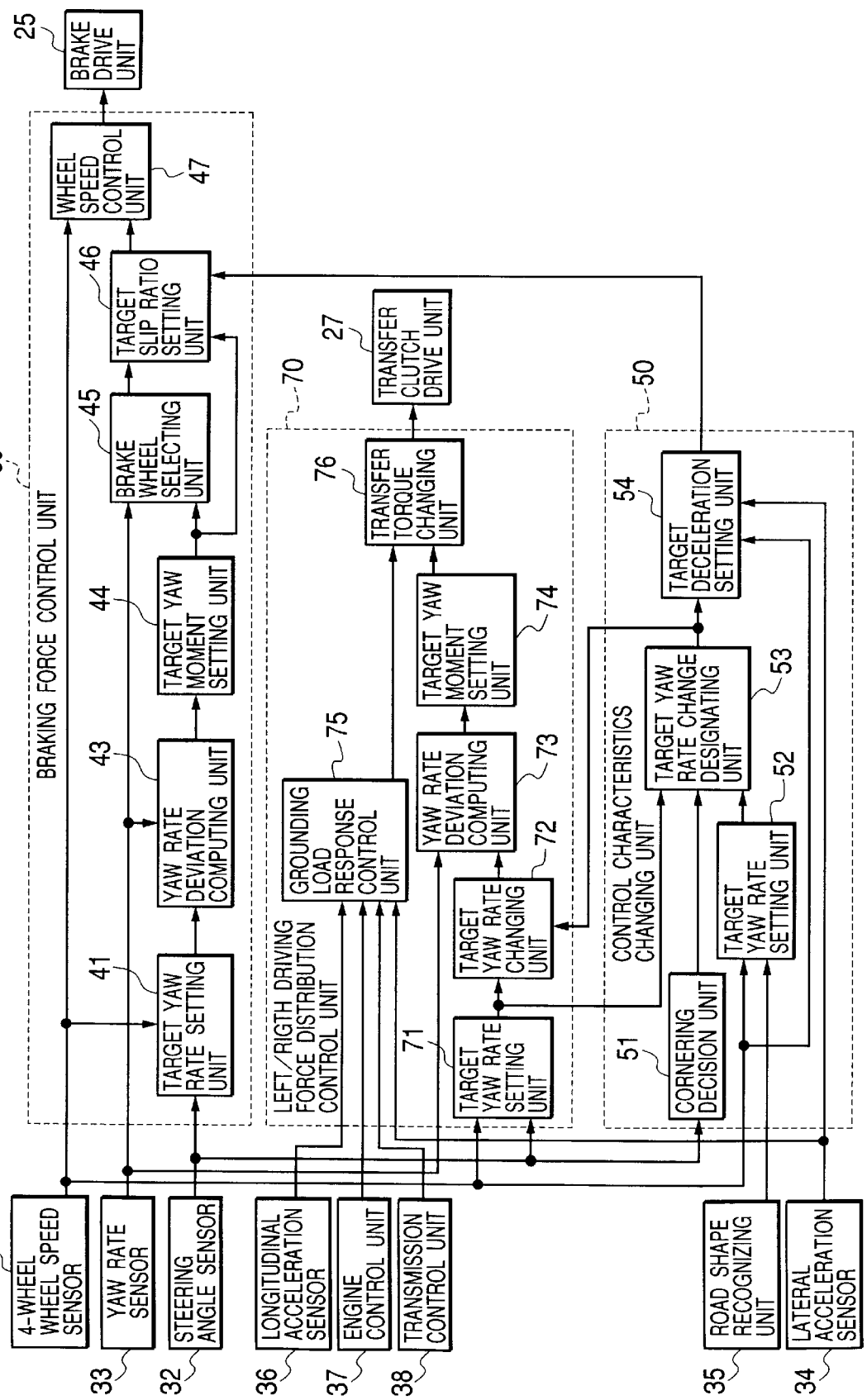
FIG. 7 is the functional block diagram of the vehicle behavior control apparatus.

Next, FIGS. 6 to 8 show a second embodiment of the invention. FIG. 6 is a schematic diagram for explaining the vehicle behavior control apparatus in the vehicle 1 as a whole. FIG. 7 is a functional block diagram of the vehicle behavior control apparatus. FIG. 8 is a flow chart of a control characteristic changing routine. Here, the second embodiment is provided with a left/right driving force distribution control unit for controlling the left/right driving force distribution of the rear wheels during a cornering thereby to improve the running stability. The correction of the target yaw rate by the control characteristics changing unit is done (performed) on the left/right driving force distribution control unit. The change in the target deceleration Gxt is done like the foregoing first embodiment on the braking force control unit. The portions similar to those of the first embodiment will not be described by designating thereof by the common reference numerals.

As shown in FIG. 6, the rear wheel final reduction unit 8 has a differential function and a power distribution function between the rear left and right wheels 15rl, 15rr. The rear wheel final reduction unit 8 includes: a bevel gear type differential mechanism unit 81; a gear mechanism unit 82 of three trains of gears; and two sets of clutch mechanism units 83 for making variable the driving force distribution between the left and right rear wheels 15rl, 15rr. The components are integrally housed in a differential carrier 84.

The drive pinion 7 meshes with a final gear 86 mounted on an outer circumference (periphery) of a differential case 85 of the differential unit 81 thereby to transmit the driving force distributed on the rear wheel side from the center differential unit 4.

The differential unit 81 has a differential pinion (or bevel gear) 88 borne rotatably on a pinion shaft 87 fixed in the differential case 85, and left and right side gears (or bevel gears) 89L and 89R meshing with the differential pinion 88 in the differential case 85. In the differential case 85, the side gears 89L and 89R, respectively, are fixed to ends of the rear wheel left and right drive shafts 14rl and 14rr.

Specifically, the differential unit 81 has the differential case 85 which is rotated on the common axes of the side gears 89L and 89R by the rotation of the drive pinion 7 thereby to effect the differential rotations between the rear left and right wheels 15rl, 15rr by the gear mechanism in the differential case 85.

The gear mechanism unit 82 is divided into the left and right sides of the differential mechanism unit 81. A first gear 82z1 is fixed on the rear wheel left drive shaft 14rl whereas a second gear 82z2 and a third gear 82z3 are fixed on the rear wheel right drive shaft 14rr. These first, second and third gears 82z1, 82z2 and 82z3 are arranged on the common axis of the rotation.

The first, second and third gears 82z1, 82z2 and 82z3 mesh with fourth, fifth and sixth gears 82z4, 82z5 and 82z6 arranged on the common rotational axis. Among which, the fourth gear 82z4 is fixed on the left wheel side end portion of a torque bypass shaft 90 which is arranged on the rotational axe of the fourth, fifth and sixth gears 82z4, 82z5 and 82z6.

At the right wheel side end portion of the torque bypass shaft 90, there is formed a right side transfer clutch 83a of the clutch unit 83 for executing the power distribution between the rear left and right wheels 15rl, 15rr. The torque bypass shaft 90 can be freely connected through the right side transfer clutch 83a (as the torque bypass shaft 90 is located on the clutch hub side whereas the stem side of the sixth gear 82z6 is located on the clutch drum side) to the stem of the sixth gear 82z6 arranged on the left side of the right side transfer clutch 83a.

At a position of the torque bypass shaft 90 between the differential mechanism unit 81 and the fifth gear 82z5, moreover, there is disposed a left side transfer clutch 83b of the clutch unit 83. The torque bypass shaft 90 can be freely connected through the left side transfer clutch 83b (as the torque bypass shaft 90 is located on the clutch hub side whereas the stem side of the fifth gear 82z5 is located on the clutch drum side) to the stem of the fifth gear 82z5 arranged on the right side of the left side transfer clutch 83b.

The first, second, third, fourth, fifth and sixth gears 82z1, 82z2, 82z3, 82z4, 82z5 and 82z6 are setted to have teeth numbers z1, z2, z3, z4, z5 and z6 of 82, 78, 86, 46, 50 and 42, respectively. With respect to the gear train ((z4/z1)=0.56) of the first and fourth gears 82z1 and 82z4, the gear train ((z5/z2)=0.64) of the second and fifth gears 82z2 and 82z5 is an accelerating one, and the gear train ((z6/z3)=0.49) of the third and sixth gears 82z3 and 82z6 is a decelerating one.

When both of the right and left side transfer clutches 83a and 83b are not operatively connected, therefore, the driving force from the drive pinion 7 is equally distributed through the differential unit 81 between the rear wheel left and right drive shafts 14rl and 14rr. When the right side transfer clutch 83a is operatively connected, however, the driving force distributed to the rear right drive shaft 14rr is partially returned to the differential case 85 through the third gear 82z3, the sixth gear 82z6, the right side transfer clutch 83a, the torque bypass shaft 90, the fourth gear 82z4 and the first gear 82z1 sequentially in the recited order. As a result, the torque distribution to the left rear wheel 15rl is increased to improve the rightward turnability of the vehicle 1 for an ordinary frictional road surface $\mu$.

When the left side transfer clutch 83b is operatively connected, on the contrary, the driving force transmitted from the drive pinion 7 to the differential case 85 is partially bypassed to the rear right drive shaft 14rr through the first gear 82z1, the fourth gear 82z4, the torque bypass shaft 90, the left side transfer clutch 83b, the fifth clutch 82z5 and the second gear 82z2 sequentially in the recited order so that the torque distribution to the right rear wheel 15rr is enlarged to improve the leftward turnability of the vehicle 1 for the ordinary frictional road surface $\mu$.

The right and left side transfer clutches 83a and 83b are connected to a transfer clutch drive unit 27 with a hydraulic circuit having a plurality of solenoid valves, so that the clutches 83a and 83b are released/applied with the oil pressure which is established by the transfer clutch drive unit 27. Moreover, control signals (or output signals for the individual solenoid valves) for driving the transfer clutch drive unit 27 are outputted from a left/right driving force distribution control unit 70.

The target yaw rate $\gamma t$ (or the second target yaw rate) to be used for the left/right driving force distribution unit 70 is corrected and setted, if necessary, by the control characteristics changing unit 50. A braking force control unit 60 is so connected that the lateral acceleration is exclusively corrected by the control characteristics changing unit 50.

The vehicle 1 is provided with individual sensors for detecting the input parameters necessary for the control characteristics changing unit 50, the braking force control unit 60 and the left/right driving force distribution unit 70, and is connected with other control units so that the necessary data are inputted thereto. Specifically, the wheel speeds of the individual wheels 15fl, 15fr, 15rl and 15rr are detected by the wheel speed sensors 31fl, 31fr, 31rl and 31rr, and the steering angle θH is detected by the steering angle sensor 32. The detected values are inputted to the control characteristics changing unit 50, the braking force control unit 60 and the left/right driving force distribution unit 70. The actual yaw rate $\gamma$ is detected by the yaw rate sensor 33 and is inputted to the braking force control unit 60 and the left/right driving force distribution unit 70. Moreover, the actual lateral acceleration Gy is detected by the lateral acceleration sensor 34 and is inputted to the control characteristics changing unit 50 and the left/right driving force distribution unit 70. The road shape (e.g., the curve radius Rn) is detected by the road shape recognizing unit 35 and is inputted to the control characteristics changing unit 50. The longitudinal acceleration Gx is detected by the longitudinal acceleration sensor 36 and is inputted to the left/right driving force distribution unit 70. With the left/right driving force distribution unit 70, there are connected an engine control unit 37 for controlling the engine 2 generally (e.g., controls of a fuel injection rate control, an ignition time and so on), and a transmission control unit 38 for the shift control of the automatic transmission 3 and the transfer control of the transfer clutch 21. Thus, to the left/right driving force distribution unit 70, there are inputted: an engine output torque Te from the engine control unit 37; a transmission gear ratio Gt from the transmission control unit 38; and a torque distribution ration Ctc (0 to 1) by the center differential unit 4.

Next, the structures of the control characteristics changing unit 50, the braking force control unit 60 and the left/right driving force distribution unit 70 will be described with reference to the functional block diagram of FIG. 7.

The control characteristics changing unit 50 of the second embodiment has a similar structure to that of the foregoing first embodiment except that the changing unit 50 receives the second target yaw rate γt, as inputted to the target yaw rate change designating unit 53, from a target yaw rate setting unit 71 of the left/right driving force distribution unit 70, and the unit 50 outputs the corrected second target yaw rate γt' to a target yaw rate changing unit 72 of the left/right driving force distribution unit 70. The target deceleration Gxt of the target deceleration setting unit 54 is outputted to the target slip ratio setting unit 46 of the braking force control unit 60.

The braking force control unit 60 determines the target yaw moment Mz(t) with the deviation between the second target yaw rate γt and the actual yaw rate γ, and controls the braking force on the basis of the target yaw moment Mz(t) The second target yaw rate γt is not corrected by the control characteristics changing unit 50. Therefore, the target yaw rate changing unit 42 is omitted from the structure.

Moreover, the left/right driving force distribution unit 70 includes the target yaw rate setting unit 71, the target yaw rate changing unit 72, a yaw rate deviation computing unit 73, a target yaw moment setting unit 74, a grounding load response control unit 75 and a transfer torque changing unit 76.

Here, the target yaw rate setting unit 71, the target yaw rate changing unit 72, the yaw rate deviation computing unit 73 and the target yaw moment setting unit 74 correspond to the target yaw rate setting unit 41, the target yaw rate changing unit 42, the yaw rate deviation computing unit 43 and the target yaw rate setting unit 44 of the braking force control unit 40 in the first embodiment.

Specifically, the target yaw rate setting unit 71 receives the steering angle θH from the steering angle sensor 32 and the wheel speeds of the four wheels 15fl, 158fr, 15rl, 15rr from the four-wheel wheel speed sensors 31fl, 31fr, 31rl and 31rr. Then the target yaw rate setting unit 71 computes the second target yaw rate γt on the basis of those driving conditions by the Formula (1) and outputs the signal to the target yaw rate changing unit 72 and the target yaw rate designating unit 53 of the control characteristics changing unit 50.

In the target yaw rate changing unit 72, the second target yaw rate γt is inputted from the target yaw rate setting unit 71, and the corrected second target yaw rate γt' is inputted, if necessary, from the target yaw rate change designating unit 53 of the control characteristics changing unit 50. When the corrected second target yaw rate γt' is inputted from the target yaw rate change designating unit 53, the target yaw rate changing unit 72 changes the corrected second target yaw rate γt' as the second target yaw rate γt for correcting the transfer torque, and outputs the signal to the yaw rate deviation computing unit 73.

This yaw rate deviation computing unit 73 receives the actual yaw rate γ from the yaw rate sensor 33 and the second target yaw rate γt from the target yaw rate changing unit 72. Then, the raw rate deviation computing unit 73 computes the yaw rate deviation Δγ by the Formula (2) and outputs it to the target yaw moment setting unit 74.

This target yaw moment setting unit 74 receives the yaw rate deviation Δγ from the yaw rate deviation computing unit 73, and computes the target yaw moment Mz(t) by the Formula (3) and outputs the signal to the transfer torque changing unit 76.

The grounding load response control unit 75 receives the actual lateral acceleration Gy from the lateral acceleration sensor 34, the longitudinal acceleration Gx from the longitudinal acceleration sensor 36, the engine torque Te from the engine control unit 37, the transmission gear ratio Gt from the transmission control unit 38, and the torque distribution ratio Ctc (0 to 1) by the center differential unit 4. Then, the grounding load response control unit 75 computes a rear-wheel left/right grounding load distribution Xr by the following Formula (19). Moreover, the grounding load response control unit 75 computes a transfer torque Ttrf by the following Formula (21) on the basis of the rear-wheel left/right grounding load distribution Xr, and outputs the signal to the transfer torque changing unit 76.

Specifically:

$$\text{Longitudinal Load Movement } \Delta Fzx = (\tfrac{1}{2}) \cdot m \cdot Gx \cdot (h/L) \qquad (16)$$

$$\text{Rear Axle Left/Right Load Movement } \Delta Fzyr = Ckr \cdot m \cdot |Gy| \cdot (h/d) \quad (17)$$

$$\text{Grounding Load Fzi of Rear Axle Turning Inner Race} = Fzr0 + \Delta Fzx - \Delta Fzyr \qquad (18)$$

$$Xr = Fzi/(2 \cdot (Fzr0 + \Delta Fzx)) \qquad (19)$$

wherein: h designates the height of center of gravity; Ckr designate a roll rigidity sharing ratio (0 to 1) of the rear axle; d designates a tread; and Fzr0 designate a rear wheel load at a standstill.

If the final gear ratio is designated by Gf, the total drive torque Tr of the rear axle is expressed by:

$$Tr = Te \cdot Gt \cdot (1 - Ctc) \cdot Gf \qquad (20)$$

Hence, the following Formula is obtained:

$$Ttrf = Tr \cdot (0.5 - Xr) \qquad (21)$$

The transfer torque changing unit 76 receives the transfer torque Ttrf from the grounding load response control unit 75 and the target yaw moment Mz(t) from the target yaw moment setting unit 74. The transfer torque changing unit 76 computes a transfer torque correction ΔTtrf from the following Formula (22) so that the unit 26 controls the transfer clutch drive unit 27 with a transfer torque Ttrf' (=Ttrf+ΔTtrf) corrected.

$$\Delta Ttrf = Mz(t)/(d \cdot Rt) \quad (22)$$

wherein Rt designates a tire diameter.

Thus, in this second embodiment: the road shape recognizing unit 35 is constituted as a road shape recognizing unit; the cornering decision unit 51 as a turning decision unit; the target yaw rate setting unit 52 as a first target yaw rate setting unit; the target yaw rate setting unit 71 as a second target yaw rate setting unit; and the target yaw rate change designating unit 53 as a target yaw rate correcting unit. The target yaw rate changing unit 72, the yaw rate deviation computing unit 73, the target yaw moment setting unit 74, the grounding load response control unit 75 and the transfer torque changing unit 76 has the left/right driving force distribution setting unit, and the target deceleration setting unit 54 has the functions of target lateral acceleration setting unit and deceleration control unit.

Next, FIG. 8 is a flow chart showing a control characteristics changing routine to be executed in the control characteristics changing unit 50. First of all, at S101, the necessary parameters are read in, and the routine advances to S102, at which the first target yaw rate γc based on the curve radius Rn is computed in the target yaw rate setting unit 52 by the Formula (12). Then, the routine advances to S103, at which it is decided in the cornering decision unit 51 whether or not the steering angle θH is equal to or larger than the presetted value θHc.

If the steering angle θH is equal to the set value θHc, it is decided that the driver has the cornering will, and the routine advances to S201. If the steering angle θH is smaller than the setted value θHc, it is decided that the driver does not have the will for cornering, and the operations leave the program.

If the routine decides the cornering will at S103 and advances to S201, it reads the second target yaw rate γt based on the driving conditions computed at the target yaw rate setting unit 71 of the left/right driving force distribution unit 70, and advances to S105.

At S105, the first target yaw rate γc and the second target yaw rate γt are compared in the absolute values. If the absolute value |γc| of the first target yaw rate γc is larger than the absolute value |γt| of the second target yaw rate γt, it is decided that the operation of the driver shorts thereof for the actual road shape, and the routine advances to S106. If the absolute value |γc| of the first target yaw rate γc is no more than the absolute value |γt| of the second target yaw rate γt, it is decided that the operation of the driver is enough, and the routine leaves the program.

If the routine decides at S105 that the operation of the driver shorts thereof for the actual road shape and advances to S106, the second target yaw rate γt is corrected by the Formula (13) to increase/decrease to the first target yaw rate γc, and the routine advances to S202, at which the corrected second target yaw rate γt' is outputted to the target yaw rate changing unit 72 of the left/right driving force distribution unit 70. In short, the operations of S201, S105, S106 and S202 are done (performed) at the target yaw rate designating unit 53.

After that, the routine advances to S108, at which the target lateral acceleration Gyt is computed by the Formula (14) on the basis of the corrected second target yaw rate γt', and the routine further advances to S109.

At S109, the absolute value |Gyt| of the target lateral acceleration Gyt and the absolute value |Gy| of the actual lateral acceleration Gy are compared. If the absolute value |Gyt| of the target lateral acceleration Gyt is larger than the absolute value |Gy| of the actual lateral acceleration Gy, it is decided that a sufficient control is not made only by the left/right driving force distribution unit 70, and the routine advances to S110, at which the target deceleration Gxt is computed by the Formula (15). At S111, this target deceleration Gxt is outputted to the target slip ratio setting unit 46, and the routine leaves the program. If it is decided at S109 that the absolute value |Gyt| of the target lateral acceleration Gyt is equal to or less than the absolute value |Gy| of the actual lateral acceleration Gy, on the other hand, the routine leaves the program without any further operation. In short, the operations of S108 to S111 are done (executed) at the target deceleration setting unit 54.

Thus, according to the second embodiment, compared are the first target yaw rate γc based on the curve radius Rn and the second target yaw rate γt based on the driving conditions. If the absolute value |γc| of the first target yaw rate γc is larger than the absolute value |γt| of the second target yaw rate γt, it is decided that the operation of the driver is insufficient, and the control is made to approach the first target yaw rate γc. Therefore, the deviation from the lane or the road due to an improper operation of the driver can be prevented without any unnatural feeling by reflecting the intention of the driver to the maximum.

At this time, the absolute value |Gyt| of the target lateral acceleration Gyt and the absolute value |Gy| of the actual lateral acceleration Gy are compared. If the absolute value |Gyt| of the target lateral acceleration Gyt is larger than the absolute value |Gy| of the actual lateral acceleration Gy, it is decided that a sufficient control is not made only by the left/right driving force distribution unit 70, and corrected is the target slip ratio λt of the braking force control unit 60. Therefore, it is possible to prevent the deviation from the lane or the road due to the improper operation of the driver more reliably.

According to the present invention, as has been described hereinbefore, the deviation from the lane or the road due to the improper operation of the driver can be prevented without any unnatural feeling by reflecting the intention of the driver to the maximum.

While the presently preferred embodiments of the present invention have been shown and described, it is to be understood that the disclosures are for the purpose of illustration and that various changes and modifications may be made without departing from the scope of the invention as set forth in the appended claims.

What is claimed is:

1. A vehicle behavior control apparatus comprising:
   a road shape recognizing unit for recognizing the road shape ahead of a vehicle;
   a first target yaw rate setting unit for setting a first target yaw rate on the basis of said road shape;
   a second target yaw rate setting unit for setting a second target yaw rate on the basis of driving conditions of the vehicle;
   a target yaw rate correcting unit for correcting said second target yaw rate on the basis of said first target yaw rate; and
   a braking force setting unit for applying a braking force to a selected wheel so that an actual yaw rate converges into the second target yaw rate corrected by said target yaw rate correcting unit.

2. The vehicle behavior control apparatus according to claim 1, further comprising:
   a turning decision unit for deciding a turning intention if a steering angle exceeds a presetted value, wherein said target yaw rate correcting unit corrects said second target yaw rate gradually toward said first target yaw rate if said turning decision unit decides the turning intention.

3. The vehicle behavior control apparatus according to claim 1, further comprising:
   a target lateral acceleration setting unit for setting a target lateral acceleration on the basis of either the second target yaw rate corrected by said target yaw rate correcting unit or the actual yaw rate; and
   a deceleration control unit for making a deceleration control if an actual lateral acceleration is below said target lateral acceleration.

4. A vehicle behavior control apparatus comprising:
   a road shape recognizing unit for recognizing the road shape ahead of a vehicle;
   a first target yaw rate setting unit for setting a first target yaw rate on the basis of said road shape;
   a second target yaw rate setting unit for setting a second target yaw rate on the basis of the driving conditions of the vehicle;
   a target yaw rate correcting unit for correcting said second target yaw rate on the basis of said first target yaw rate; and
   a driving force distribution unit for setting the driving force distribution to left and right wheels so that an actual yaw rate converges into the second target yaw rate corrected by said target yaw rate correcting unit.

5. The vehicle behavior control apparatus according to claim 4, further comprising:
   a turning decision unit for deciding a turning intention if a steering angle exceeds a presetted value,
   wherein said target yaw rate correcting unit corrects said second target yaw rate gradually toward said first target yaw rate if said turning decision unit decides the turning intention.

6. The vehicle behavior control apparatus according to claim 4, further comprising:
   a target lateral acceleration setting unit for setting a target lateral acceleration on the basis of either the second target yaw rate corrected by said target yaw rate correcting unit or the actual yaw rate; and
   a deceleration control unit for making a deceleration control if an actual lateral acceleration is below said target lateral acceleration.

7. A vehicle behavior control method comprising:
   recognizing the road shape ahead of a vehicle;
   setting a first target yaw rate on the basis of said road shape;
   setting a second target yaw rate on the basis of the driving conditions of the vehicle;
   correcting said second target yaw rate on the basis of said first target yaw rate; and
   applying a braking force to a selected wheel so that an actual yaw rate converges into the corrected second target yaw rate.

8. The vehicle behavior control method according to claim 7, further comprising:
   deciding a turning intention if a steering angle exceeds a presetted value,
   wherein said second target yaw rate is corrected gradually toward said first target yaw rate if the turning intention is decided.

9. The vehicle behavior control method according to claim 7, further comprising:
   setting a target lateral acceleration on the basis of either the corrected second target yaw rate or the actual yaw rate; and
   making a deceleration control if an actual lateral acceleration is below said target lateral acceleration.

10. A vehicle behavior control method comprising:
    recognizing the road shape ahead of a vehicle;
    setting a first target yaw rate on the basis of said road shape;
    setting a second target yaw rate on the basis of the driving conditions of the vehicle;
    correcting said second target yaw rate on the basis of said first target yaw rate; and
    setting the driving force distribution to left and right wheels so that an actual yaw rate converges into the corrected second target yaw rate.

11. The vehicle behavior control method according to claim 10, further comprising:
    deciding a turning intention if a steering angle exceeds a presetted value,
    wherein said second target yaw rate is corrected gradually toward said first target yaw rate if the turning intention is decided.

12. The vehicle behavior control method according to claim 10, further comprising:
    setting a target lateral acceleration on the basis of either the corrected second target yaw rate or the actual yaw rate; and
    making a deceleration control if an actual lateral acceleration is below said target lateral acceleration.

* * * * *